United States Patent [19]
Grabb

[11] 3,989,539
[45] Nov. 2, 1976

[54] BATTERY GRID
[75] Inventor: Nicholas G. Grabb, Scarborough, Canada
[73] Assignee: Varta Batteries Ltd., Scarborough, Canada
[22] Filed: Dec. 1, 1975
[21] Appl. No.: 636,724

[52] U.S. Cl. .................................. 429/241; 29/2; 429/245
[51] Int. Cl.² ........................................ H01M 4/72
[58] Field of Search .............................. 136/36–67; 29/2

[56] References Cited
UNITED STATES PATENTS

| | | | |
|---|---|---|---|
| 1,376,929 | 5/1921 | Ford | 136/48 |
| 1,437,468 | 12/1922 | Ford | 136/48 |
| 2,515,204 | 7/1950 | Evans | 136/36 |
| 3,117,893 | 1/1964 | Sundberg | 136/51 |
| 3,923,545 | 12/1975 | Margulies et al. | 136/36 |

Primary Examiner—John H. Mack
Assistant Examiner—C. F. Lefevour

[57] ABSTRACT

An improved rectangular shaped lead-acid storage battery grid comprises in combination, tapered vertical grid wires, tapered side and top frame wires, additional vertical grid wires disposed between the tapered vertical grid wires and two diagonal grid wires which extend from the grid portion containing the additional grid wires to the side and bottom frame wires. Not all the vertical grid wires are tapered. The last of the tapered vertical grid wires is spaced from the side frame wire adjacent the lug, a distance of more than approximately 30 per cent and up to approximately 50 per cent of the entire length of the top frame wire. The additional vertical grid wires extend downwardly from the top frame wire a distance of approximately 30 to 50 per cent of the length of the side frame wire. A battery cell made up of this type of grid has approximately 5 to 10 per cent increased high amperage discharge rate compared to a battery having a standard type of grid. The grid also has increased structural rigidity compared to standard battery grids.

6 Claims, 5 Drawing Figures

BATTERY GRID

FIELD OF THE INVENTION

This invention relates to an improved battery grid construction of the type used in a lead-acid storage battery.

BACKGROUND OF THE INVENTION

Lead-acid storage batteries are widely used alternate sources of electrical energy, such as in vehicles, backup systems for emergency lighting and for emergency operation of equipment such as telephone equipment, hospital emergency equipment and the like. Improving the efficiency and performance of a lead-acid storage battery is therefore of importance, particularly improving the efficiency of a battery grid which holds the active material in a battery. Various approaches in improving the battery grid have been taken, for example, supporting the electrically conducting grid wire by a plastic frame in a particular design. To manufacture a grid of that structure requires somewhat difficult assembly procedures so that its cost of manufacture is at present prohibitive compared to the cost of standard methods of battery grid manufacture.

It is therefore an object of this invention to provide an improved lead-acid storage battery grid structure which is easy to manufacture in accordance with standard methods and is capable of increasing the high amperage discharge rate by 5 to 10 percent in a battery containing such grids relative to a battery containing standard grids.

It is another object of the invention to provide a lead-acid storage battery grid comprising a grid wire design which increases the battery capacity at high amperage discharge rate and which economizes on the amount of lead used in the battery grid wires.

It is yet another object of the invention to provide an arrangement of grid wires in the battery grid which enhances the structural strength of the battery grid to withstand rough handling and abuse during loading of the grid with active material, assembly of battery cells and assembly of the entire battery.

BRIEF SUMMARY OF THE INVENTION

The improved battery grid according to this invention comprises in combination a plurality of interconnected vertical and horizontal grid wires surrounded by and connected to top, bottom and first and second side frame wires with a lug on the top frame wire located adjacent the first side frame wire. A series of the vertical grid wires are each tapered and which increase in cross-sectional area in a direction towards the top of the grid. The first of the tapered vertical wires is adjacent the first side frame wire and the last of the tapered vertical grid wires in the series is spaced from the first side frame wire a distance of more than approximately 30 percent and up to approximately 50 percent of the entire length of the top frame wire.

The top and first side frame wires of the grid are tapered and increase in cross-sectional area in a direction towards the lug.

Additional vertical grid wires are positioned between adjacent tapered vertical grid wires of the series where the additional vertical grid wires extend downwardly from the top frame wire a distance of approximately 30 to 50 percent of the length of a side frame wire.

Two diagonal grid wires are spaced apart from each other and extend away from the portion of the battery grid containing the additional vertical grid wires. The diagonal grid wires extend out to the bottom frame wire and the second side frame wire.

The grid wires conduct electrical current to the lug of the positively or negatively charged plate during discharge of a battery. The grid wire design of this invention was developed to increase and at the same time accommodate the increased flow of electrical current to the lug of the battery plate during high amperage discharge rates of the battery. It was discovered that this design for the grid wires increased the battery's discharge capacity 5 to 10 percent above the capacity of the same size of battery having standard plates. The grid wire desing also economizes on the amount of lead used in forming the grid wires as long as the number of tapered vertical grid wires and the length of the additional vertical grid wires in the grid wire formation fall within the ranges specified.

The diagonal wires and the additional vertical grid wires divide the spaces defined between the vertical and the horizontal grid wires so that when these smaller spaces are filled with biscuits or pellets of active material, the generated current in the central region of the pellet has a shorter flow path to the grid wire. The smaller biscuits of active material adjacent the battery plate lug therefore provide more electrical current than the large biscuits of active material remote from the lug during high amperage battery discharge. The tapered vertical wires which increase in cross-sectional area towards the lug thereby provide greater cross-sectional area of lead to accommodate the increased current flow in the area of the smaller biscuits of active material so that there is less resistance to current flow towards the lug and as a result, the high current amperage discharge rate of the battery is increased by at least 5 to 10 percent.

DESCRIPTION OF THE DRAWINGS

These and other objects, advantages and features of the invention will become apparent in the following detailed description of the preferred embodiments of the invention as shown in the drawings wherein.

DETAILED DESCRIPTION OF THE PREFERRED EMBODIMENTS

Figure 1:
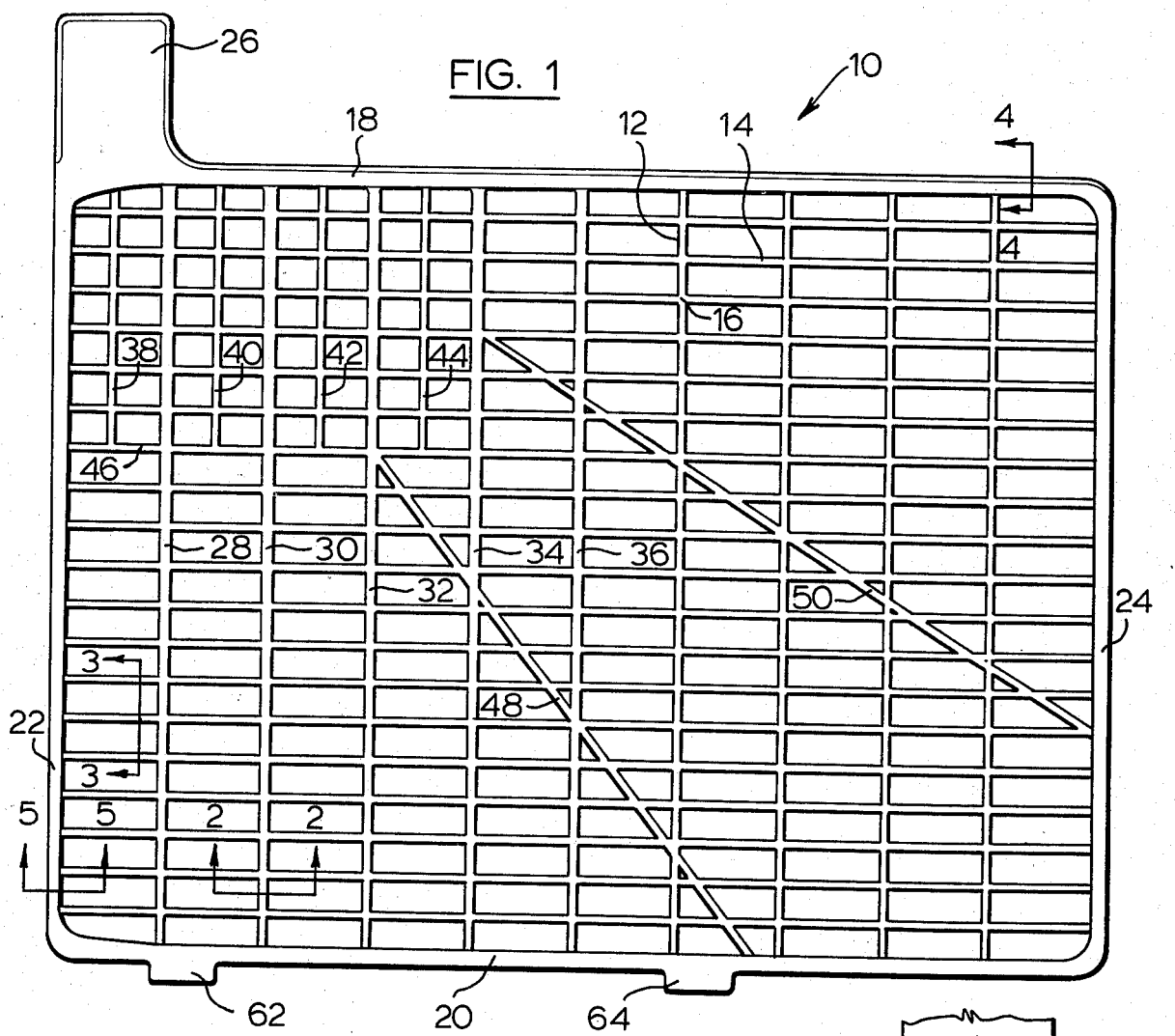
FIG. 1 is a plan view showing a battery grid according to a preferred embodiment of this invention.

A preferred embodiment of the battery grid according to this invention is shown in FIG. 1. The battery grid 10 comprises a plurality of vertical and horizontal wires 12 and 14 interconnected with one another at their junction 16. Surrounding the vertical and horizontal wires are top and bottom frame wires 18 and 20 and first and second side frame wires 22 and 24. On the top frame wire 18, a lug 26 is located adjacent and in this instance, integral with first side frame wire 22. A series 28, 30, 32, and 36 of the vertical grid wires 12 are tapered where the cross-sectional area of each tapered wire 28 to 36 increases gradually in a direction towards the top frame wire 18. The thickness of wires 28 to 36 at their bottoms is approximately equal to the thickness at the bottom of standard vertical grid wires 12. The thickness of the tapered vertical grid wires at the top may be more or less twice the thickness at their bottom.

The first of the series of tapered wires 28 is adjacent first side frame wire 22. The number of tapered vertical wires in the series depends upon the overall length of the battery grid and the expected high amperage discharge rate demands to be placed on the battery. The type of battery grid shown in the drawings is of the type which would be used in a standard car battery; however, as it is well known, batteries used in association with large diesel engines and other equipment which demand an even greater high amperage discharge rate are capable of responding to such demands by increasing the size of the plate. By analysis of the various plate sizes, it was found that the number of tapered vertical wires which would be sufficient to handle the increased current flow in the improved battery grid take up a space of approximately 30 to 50 percent along the length of the top frame wire. In a preferred embodiment shown, tapered vertical wire 36 is spaced from the first side frame wire 22 a distance which is approximately 50 percent of the length of top frame wire 18. The location of the last tapered vertical wire of the series is therefore usually determined by providing a tapered vertical wire closest to the selected point along the top frame wire which falls within the 30 to 50 percent range.

The last tapered vertical wire of the series should not be spaced from the side frame wire 22 less than 30 percent of the length of the top frame wire because in this instance the internal resistance of the battery grid would be increased sufficiently to decrease the rate of flow of electric current to the battery lug thereby decreasing the overall high discharge rate of the battery. As to the upper limit, the last tapered vertical grid wire of the series should not be spaced from the side frame wire more than approximately 50 percent of the top frame wire's length because the current density in the grid this far out from the first side frame wire is substantially less than that within the range specified. The increased cross-sectionals of lead is therefore not required to handle the current flow at locations beyond approximately 50 percent of length of top frame wire from the side frame wire 22. The amount of lead used in the grid is therefore economized because beyond this range, only standard narrower vertical grid wires need be used. With the type of grid used in a car battery, it has been found that 40 percent of the length along the top frame wire is most acceptable. As shown in FIG. 1, there are therefore five tapered grid vertical wires.

If the spacing between the vertical wires is decreased, then to meet the current flows in the battery at high discharge rates, only approximately 30 to 40 percent of the top frame wire length may need be taken up by tapered vertical wires.

Additional vertical grid wires 38, 40, 42 and 44 are positioned between the series of tapered vertical wires 28, 30, 32 and 34 and also between the first side frame wire 22 and the first tapered wire 28. The additional grid wires are incorporated to handle the increased current density generated by the resultant smaller biscuits of active material in the area adjacent the lug. The distance that the additional vertical wires extend downwardly from top frame wire 18 is approximately 30 to 50 percent of the length of first side wire 22. Anything less than this range would result in decreased capabilities of the grid handling the current flows and anything beyond this range results in a wastage of lead since the increased amount of additional vertical wires in the lower area of the grid does not improve the capacity of the grid.

A further feature realized by the provision of additional vertical wires is when the grid is loaded with active material to fill the spaces defined by the horizontal and vertical grid wires, the provision of the additional vertical wires defines smaller spaces within which the active material is held. These smaller biscuits or pellets of active material provide less volume of active material per volume of grid wire so that current generated per unit volume of biscuits is transferred more readily to the grid wire and then conducted by the grid wire to the lug 26. The increased current generation in the area of the additional vertical grid wires defined by the first side wire 22, horizontal wire 46, tapered wire 34 and top frame wire 18, is readily conducted toward lug 26 by the increased cross-sectional areas of lead in tapered wires 28, 30 32, and 34, and the additional vertical wires.

Two diagonal wires 48 and 50 are spaced apart and extend from the portion of the battery grid which contains additional vertical wires. Diagonal wire 48 extends to bottom frame wire 20 and diagonal wire 50 extends to the second side frame wire 24 where the diagonal wires are interconnected with the horizontal and vertical wires 12 and 14 and the tapered wires 34 and 36. These diagonal wires direct current generated by biscuits of active material in areas remote from the lug in a direction towards the lug. The diagonal wires also serve to divide some of the spaces defined between the horizontal and vertical wires to provide smaller biscuits of active material thereby generating higher rates of current output in these area. The current generated is immediately conducted by the diagonal wires towards the portion containing the additional wires and the tapered wires whereby these wires readily conduct the additional current generated towards lug 26.

Figure 2:
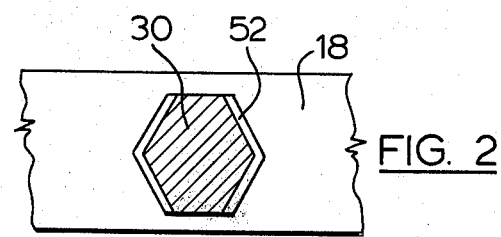
FIG. 2 is a section of the grid of FIG. 1 along lines 2—2.

The taper of the series of vertical wires is shown more clearly in FIG. 2 where each wire has a somewhat hexagonal shape. The surfaces which hold the biscuit or which are contacted by the biscuit of active material are preferably the only surfaces which are tapered. In FIG. 2, wire 30 increases in cross-sectional area towards top frame wire 18 as shown by surface 52 extending outwardly towards top frame wire 18.

Figure 3:
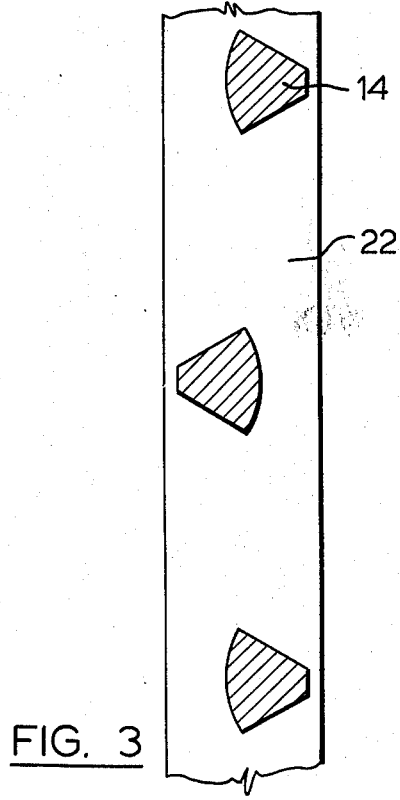
FIG. 3 is a section of the grid of FIG. 1 along lines 3—3.

FIG. 3 shows the horizontal grid wires which are somewhat of a truncated pie shape. As mentioned, these horizontal wires 14 are interconnected with vertical wires 12.

Figure 4:
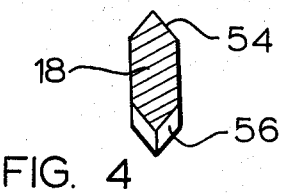
FIG. 4 is a section of the top frame wire of FIG. 1 along the lines 4—4.

Although not clearly shown in FIG. 1, top frame wire 18 is tapered. The top frame wire 18 increases in cross-sectional area in a direction towards lug 26 as shown by surface 54 extending outwardly in a direction towards lug 26 as shown by the section in FIG. 4. Surface 54 is exterior of the grid and internal surface 56 remains substantially horizontal. The vertical grid wires are not shown in FIG. 4.

Figure 5:
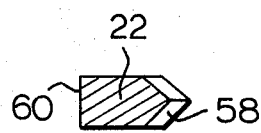
FIG. 5 is a section of a side frame wire of FIG. 1 along the lines 5—5.

In FIG. 5, first side frame wire 22 is tapered as evidenced by surface 58 extending outwardly in a direction towards lug 26. Surface 58 is interior of the grid and although not shown, the horizontal wires 14 are connected to surfaces 58 of the wire. The outer surface 60 remains substantially vertical in the direction towards lug 26. The increase in cross-sectional lead area of the top and side frame wires is required to reduce the resistance to flow of current to lug 26 to thereby increase the overall capacity of the battery in terms of high amperage discharge.

The bottom frame wire 20 includes two feet 62 and 64. These feet line up with steps or shoulders provided in the bottom of a battery case to retain the grid above the battery bottom and keep the grid wire away from deposits on a battery base. The feet 62 and 64 also facilitate the standard simultaneous casting of two battery grids where the feet space the bottom plate frame wires 29 apart from each other. After the casting is complete and cooled, the feet of one battery grid are broken away from the feet of the other battery grid to give two plates of the type shown in FIG. 1.

With the preferred embodiment shown in FIG. 1, which is of the type used in car batteries, the spacing between horizontal grid wires is approximately 2/10 of an inch. The spacing between the vertical wires is approximately 5/10 of an inch. The horizontal wires 14 are approximately 42 thousands of an inch at their widest width and the vertical wires 12 are approximately 40 thousands of an inch at their widest width.

The tapered vertical grid wires range in thickness from approximately 40 thousands of an inch at their base increasing in width up to approximately 80 thousands of an inch near the top frame wire. The additional vertical wires are the same width as the standard vertical wires. Similarly, the diagonal wires are also approximately 40 thousands of an inch thick. The additional vertical wires are integral with horizontal wire 46.

Top frame wire 18 and the first side frame wire 22 are tapered where at a point furthest removed from the lug, the thickness of the top and side frame wires is approximately 90 thousands of an inch. The width of these two frame wires increase to approximately 130 thousands of an inch adjacent the lug.

The battery grid may be cast from an antimony-lead alloy or a calcium-lead alloy of the type commonly used in batteries.

The battery grid of this invention has greater resistance to corrosion of the grid wire during overcharging of a battery because the grid wires are capable of more evenly distributing charging current throughout the grid so that the areas of the battery grid closest to the lug have more protection from overcharge corrosion than in normal types of battery grids.

The mechanical strength of the grid is improved over the mechanical strength of standard battery grids because of the addition of two diagonal wires, the additional vertical grid wires and the tapered vertical grid wires. This grid wire construction greatly adds to the structural strength of the grid around the battery lug so that the grid withstands abuse during rough handling of battery plate assemblies. Because the structural strength of the grid is increased, the grids themselves may be made somewhat thinner, therefore more plates can be placed in a standard battery case and thereby also increase the power output in this repect. On the other hand, if the same number of plates are used, it will give a lighter battery still having higher capacity. In providing a more structurally sound battery grid, the amount of antimony or calcium used in the lead alloy may be reduced since it is the purpose of the antimony or calcium to provide structural strength in the lead.

The battery grid according to this invention provides a balanced combination of structural components in the grid which give the optimum output of high discharge amperage rates and at the same time economize on the overall amount of lead used in the grid.

Although various preferred embodiments of the invention have been described herein in detail, it will be understood by those skilled in the art that modifications may be made thereto without departing from the spirit of the invention or the scope of the appended claims.

The embodiments of the invention in which an exclusive property or privilege is claimed are defined as follows:

1. An improved rectangular shaped lead-acid storage battery grid comprising in combination, a plurality of interconnected vertical and horizontal grid wires surrounded by and connected to top, bottom and first and second side frame wires with a lug on said top frame wire adjacent said first side frame wire, a series of said vertical grid wires are each tapered and which increase in cross-sectional area in a direction towards the top of said grid, the first of the tapered vertical wires being adjacent said first side frame wire, the last of the tapered vertical grid wires in said series being spaced from said first side frame wire a distance of more than approximately 30 percent and up to approximately 50 percent of the entire length of said top frame wire, said top and first side frame wires being tapered and increasing in cross-sectional area in a direction towards said lug, additional vertical grid wires positioned between adjacent tapered vertical grid wires of said series, said additional vertical grid wires extending downwardly from said top frame wire a distance of approximately 30 to 50 percent of the length of a side frame wire, said additional vertical grid wires being interconnected to said horizontal grid wires, two diagonal grid wires spaced apart from each other and extending away from the portion of said battery grid containing said additional vertical grid wires, one of the diagonal grid wires extending to the bottom frame wire and the other diagonal grid wire extending to said second side frame wire, said diagonal grid wires being interconnected with said vertical and horizontal grid wires.

2. A battery grid of claim 1 wherein there are a total of nine vertical grid wires, the first five of which starting from adjacent said first side frame wire are tapered vertical grid wires.

3. A battery grid of claim 1 wherein said grid is made of a lead-calcium alloy.

4. A battery grid of claim 1 wherein said grid is made of a lead-antimony alloy.

5. A battery grid of claim 1 wherein said tapered vertical wires are hexagonal in shape.

6. A battery grid of claim 2 wherein four of said additional vertical grid wires are positioned between said first side frame wire and the first four tapered vertical grid wires of said series.

* * * * *